Oct. 30, 1962    E. E. CONLEY    3,060,961
PIVOTED VALVE STRUCTURE
Filed Sept. 19, 1960
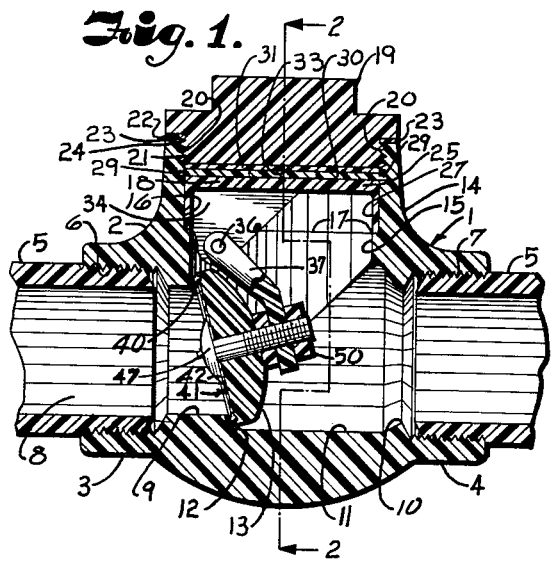
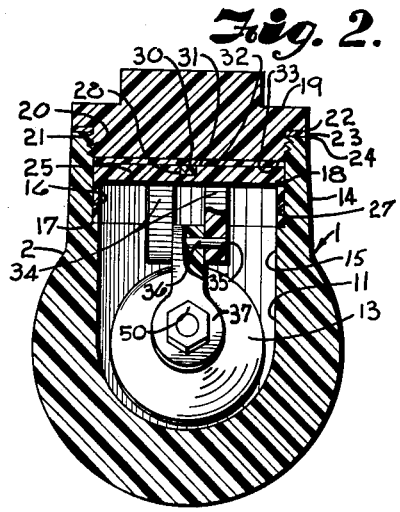
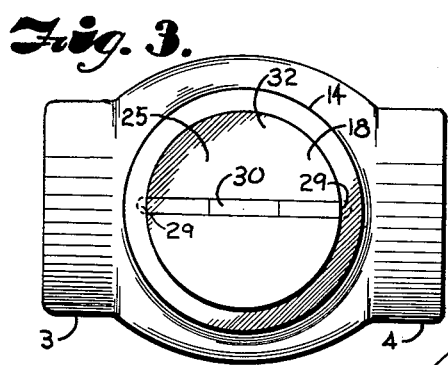
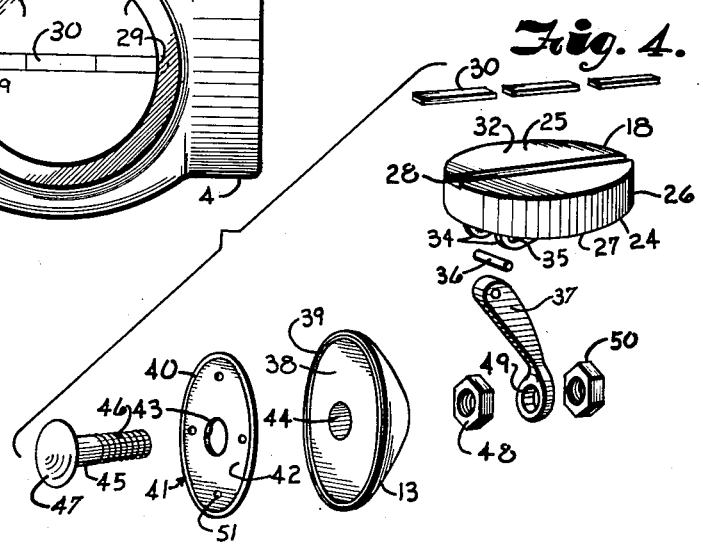
INVENTOR.
EDWIN E. CONLEY
BY
Fishburn and Gold
ATTORNEYS

United States Patent Office 3,060,961
Patented Oct. 30, 1962

3,060,961
PIVOTED VALVE STRUCTURE
Edwin E. Conley, 91st and Delaware, Tulsa, Okla.
Filed Sept. 19, 1960, Ser. No. 56,814
6 Claims. (Cl. 137—527.4)

This invention relates to valve structures and seal members, and more particularly to a novel valve structure adapted to be molded and accurately formed and seal members therefor.

In chemical and other industries wherein fluids such as liquids, gas or vapor may have corrosive or deleterious action on metals, the use of flow piping formed of plastic, such as synthetic resins and fiber-reinforced synthetic resin, has been utilized. However, it has been customary to use various metal valves in such installations due to difficulties presented in the manufacture of valve structures from synthetic resins, particularly where the valve structures must withstand substantial pressures. The present invention contemplates valve structures manufactured of synthetic resins capable of withstanding substantial pressures and having accuracies of fits for effective operation.

The principal objects of the present invention are to provide a valve seal ring and mounting diaphragm whereby the seal ring may be mounted and secured on flat faces subject to inclination; to provide a valve seal member in the form of an O-ring with an integral diaphragm adapted to be secured to a flat surface with vents in the diaphragm for equalization of pressure on both sides thereof; to provide a valve structure adapted to be molded and formed of synthetic resin or fiber-reinforced synthetic resin that is substantially inert to chemicals and the like to be flowed therethrough; to provide such a valve structure with molded aligned surfaces and locating portions whereby substantially all of the parts may be assembled without machining; to provide a valve structure that is efficient in operation, easily maintained, and capable of long life; and to provide a check valve structure wherein the parts are so arranged that all moving parts may be bodily applied or removed at any time.

Other objects and advantages of this invention will become apparent from the following description taken in connection with the accompanying drawings wherein are set forth by way of illustration and example certain embodiments of this invention.

FIG. 1 is a longitudinal sectional view through the valve structure embodying the features of the present invention.

FIG. 2 is a transverse sectional view through the valve structure on the line 2—2, FIG. 1.

FIG. 3 is a plan view of the valve structure with the cap member removed.

FIG. 4 is a disassembled perspective view of a valve member seal mounting and holder of the valve structure.

Referring more in detail to the drawings:

In the example of embodiment of the invention herein disclosed, the improved valve structure and seal is in the form of a swing check valve. However, it will readily be understood that the invention may be incorporated in other valve structures.

The numeral 1 generally designates a valve structure having a housing 2 molded of synthetic resin preferably fiberglass-reinforced synthetic resin provided with end portions 3 and 4 forming connections for attachment to a pipe line 5. In the structure illustrated, the housing end portions 3 and 4 have internal threads 6 for receiving threaded ends 7 of a pipe line 5, whereby the bore 8 of the pipe line communicates through an inlet port 9 and an outlet port 10 with an enlargement or chamber 11 therebetween. The valve housing has a seat or face 12 surrounding the inlet port 9 and adapted for coacting with a valve member 13 for interrupting flow through the housing.

The valve housing 2 has a tubular portion 14 extending substantially radially thereof and having a bore 15 communicating with the enlargement 11. The tubular portion 14 has a counterbore 16 extending toward the enlargement and terminating in a shoulder 17 for receiving a valve member holder 18 as later described. The outer end portion of the tubular portion 14 is adapted to receive a closure or cap 19 to close and seal the bore of the tubular portion 14 and, when removed, to provide access to the valve member 13. In the structure illustrated, the outer portion of the tubular portion 14 of the housing 2 is internally threaded as at 20, and the cap 19 has an externally threaded portion 21 adapted to be secured therein, said cap having an annular flange portion 22 with a compressible gasket 23 adapted to be compressed into sealing engagement with the end 24 of the tubular portion 14 when the cap 19 is in closing position.

The valve holder 18 preferably consists of a plate portion 25 having an outer peripheral surface 26 of suitable size to form a tight fit in the counterbore 16, said holder having a cylindrical wall 27 integral with and depending from the plate portion 25 and engaging the shoulder 17. The holder 18 has a key way or groove 28 in the plate portion 25 and extending diametrically of the holder, said key way 28 being adapted to register with diametrically opposite recesses 29 in the tubular portion 14 adjacent the outer end of the counterbore 16 whereby key members 30 positioned in the key way 28 will extend into the recesses 29 and accurately position the holder 18. In the illustrated structure, the key way members 30 preferably are a plurality of key parts adapted to be arranged end to end and, in the illustrated structure, the key parts are three in number with a total length greater than the diameter of the counterbore 16 whereby said outermost key members will engage in the recesses 29 and, when so positioned, the inner ends thereof will be spaced to receive the third key part to retain the outermost key parts engaged in the recess. It is preferred that a compressible gasket or disc 31 be positioned on the upper face 32 of the holder and engage with the upper faces of the key parts whereby the gasket disc is compressed between the holder and the inner face 33 of the cap 19 to form an additional seal when the gasket member 23 is compressed to form a seal at the flange 22 of the cap member.

Spaced ears 34 depend from the holder 18 and are adapted to be positioned adjacent the seat 12, said ears 34 having aligned apertures 35 receiving a pivot pin 36 which swingably supports a valve arm 37 which carries the valve member 13 on its free end. In the illustrated structure, the valve member is in the form of a disc having a flat face 38 with a groove 39 therein to receive a ring portion 40 of a seal member 41. The seal member preferably has a ring portion substantially in the form of an O-ring with an integral inwardly extending diaphragm 42 provided with a central aperture 43 adapted to register with a central through aperture 44 in the valve member 13. A suitable fastening device 45 such as a screw is provided with a threaded shank 46 to extend through the apertures 43 and 44 with the head 47 of said screw engaging the diaphragm 42 to hold same against the flat face 38 of the valve member 13. In the illustrated structure, a nut 48 is threaded on the screw shank 46 to hold the seal member and valve member assembled and the end of the screw shank 46 extends through an aperture 49 in the free end of the valve arm 37 and has a nut 50 threaded thereon to secure the valve member on the valve arm. The axis of the valve arm pivot pin 36 is arranged relative to the key way 28 and recesses 29 and the valve member face 38 and seat 12 whereby when the holder is positioned in the valve housing and the key members engaged in said recesses 29, the valve member can swing toward and away from the seat and, when moved to closed position, the valve member or seal thereon is accurately positioned relative to the seat to form a seal therewith. In the illustrated structure, the recesses 29 are in a line substantially parallel with the flow through the housing, and the axis of the pin 36 is at right angles to the key way 28, and the recesses 29 are accurately positioned relative to the seat face 12 whereby swinging movement of the valve member to closed position provides an accurate seal with the seat. It is preferred that the housing 2 be molded of suitable synthetic resins with fiberglass reinforcing therein and the internal threads 6 and 20 be molded as, for example, in the manner illustrated in the Conley Patent No. 2,751,237, issued June 19, 1956. It is also preferred that all of the other parts of the valve structure, with the exception of the compressible members, be formed of fiber-reinforced synthetic resin, and the compressible members be formed of suitable resilient synthetic resins such as suitable poly vinyls, polyethylenes or the like that are substantially inert to the particular materials to be flowed through the valve.

In assembling a valve structure molded and formed as illustrated and described, the seal member 41 is positioned on the face of the valve member 13 and is secured thereto by the fastening device 45 wihch is also utilized together with the nuts 48 and 50 to secure the valve member to the valve arm 37. The diaphragm 42 is held by the screw head 47 substantially in engagement with the face 38 of the valve member, and said diaphragm has vent holes 51 spaced outwardly from the head 47 and inwardly of the ring portion 40 to equalize pressures on both sides of the diaphragm whereby the diaphragm holds the ring portion in place to serve as a seal without danger of rupture of the diaphragm due to pressures acting thereon. The arm 37 is then assembled on to the ears 34 of the valve holder 18 by the pin 36. Then the assembly of the valve holder 18 with the valve thereon is moved to position the valve in the enlargement 11 whereby the end of the wall 27 of the holder engages the shoulder 17 in the housing, and the groove or way 28 aligns with the recesses 29 with the valve face toward the seat 12. The outermost key members 30 are then inserted in the way 28 and moved outwardly whereby the ends thereof engage in the recesses 29 and the innermost ends of the key members are separated and a third key member is then placed between the outermost key members to fill the space between the inner ends thereof and thereby hold the outermost key members engaged in the recesses, centering the holder and valve relative to the seat 12. The gasket disc 31 is then positioned over the holder 18, and the gasket ring 23 positioned on the cap adjacent the flange 22. The cap is then screwed into the outer end portion of the tubular portion 14 of the housing to close and seal same, at which position the gasket disc 31 is compressed, holding the key members 30 in the key way and the valve holder 18 against the shoulder 17 in the housing. The valve member is then ready to be connected in a pipe line, as illustrated in FIG. 1, whereby flow coming through the inlet will cause the valve to be swung to open position and that position will persist until the inlet flow lessens and reverse flow is set up whereupon reverse flow acting against the valve member will swing the valve to the closing position wherein the seal ring 40 will effect a positive seal, stopping reverse flow through the valve.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In a check valve, a housing having inlet and outlet ports communicating with an enlargement therebetween, a seat in said enlargement and surrounding the inlet port, said housing having a tubular portion extending substantially radially of said housing, said tubular portion having a bore terminating in a shoulder, a holder removably mounted in said bore and engaging said shoulder, said holder having a diametric groove therein open away from said enlargement, said tubular portion having recesses therein registering with ends of said groove, a key consisting of a plurality of separable members positioned in the said groove in end to end relation with the endmost members thereof engaged in said recesses, a cap secured to said tubular portion and having a surface fitting against said holder and key to retain same in position, and a valve member swingable on said holder and having a face coacting with said seat to stop flow in one direction and swingable away from said seat in response to flow in the opposite direction.

2. In a check valve, a housing having inlet and outlet ports communicating with an enlargement therebetween, a seat in said enlargement and surrounding the inlet port, said housing having an internally threaded tubular portion extending substantially radially of said housing, said tubular portion having a bore inwardly of said threaded portion and terminating in a shoulder, a holder removably mounted in said bore and engaging said shoulder, said holder having a diametric groove therein open toward said threaded portion, said tubular portion having recesses therein registering with ends of said groove, a key consisting of a plurality of separable members positioned in the said groove in end to end relation with the endmost members thereof engaged in said recesses, a cap having a threaded portion screwed onto said tubular portion and having a surface fitting against said holder and key to retain same in position, ears extending from said holder, and a valve member swingable on said ears and having a face coacting with said seat to stop flow in one direction and swingable away from said seat in response to flow in the opposite direction.

3. In a check value, a housing having inlet and outlet ports communicating with an enlargement therebetween, a seat in said enlargement and surrounding the inlet port, said housing having a tubular portion extending substantially radially of said housing, said tubular portion having a bore communicating with said enlargement, a holder removably mounted in said bore, said holder having a diametric groove therein, said tubular portion having recesses therein registering with ends of said groove, a key consisting of a plurality of separable members positioned in the said groove in end to end relation with the endmost members thereof engaged in said recesses, a cap secured to said tubular portion and having a surface fitting against said holder to retain said holder and key in position, a valve member swingably mounted on said holder and having a face coacting with said seat, a compressible seal ring on the valve member and presented for engagement with said seat, said seal ring having an integral thin diaphragm extending therefrom and engaging said valve member face, and mounting means engaging said diaphragm and securing said diaphragm to the valve member.

4. In a check valve, a housing having inlet and outlet ports communicating with an enlargement therebetween, a seat in said enlargement and surrounding the inlet port, said housing having an internally threaded tubular portion extending substantially radially of said housing with a bore communicating with said enlargement, said portion having a counterbore terminating in a shoulder, a holder removably mounted in said counterbore and engaging said shoulder, said holder having a diametric groove therein open toward said threaded portion, said tubular portion having recesses therein registering with ends of said groove, a key consisting of a plurality of separable members positioned in the said groove in end to end relation with the endmost members thereof engaged in said recesses, a cap secured to said tubular portion and having a surface fitting against said holder and key to retain same in position, a valve member swingably mounted on said holder and having a face coacting with said seat, a compressible O-ring on the valve member and presented for engagement with said seat, said O-ring having an integral thin diaphragm extending therefrom and engaging said valve member face, and mounting means engaging said diaphragm and securing said diaphragm to the valve member, said diaphragm having spaced vent apertures between the mounting means and the O-ring portion thereof for equalization of pressure on both sides of the diaphragm and thereby preventing rupture of same.

5. In a check valve, a housing having inlet and outlet ports communicating with an enlargement therebetween, a seat in said enlargement and surrounding the inlet port, said housing having an internally threaded tubular portion extending substantially radially of said housing with a bore communicating with said enlargement, said portion having a counterbore inwardly of said threaded portion and terminating in a shoulder, a holder removably mounted in said counterbore and engaging said shoulder, said holder having a diametric groove therein open toward said threaded portion, said tubular portion having recesses therein registering with ends of said groove, a key consisting of a plurality of separable members positioned in the said groove in end to end relation with the endmost members thereof engaged in said recesses, a cap having a threaded portion screwed onto said tubular portion and having a surface fitting against said holder and key to retain same in position, ears extending from said holder adjacent said seat, a valve member swingably mounted on said ears and having a face coacting with said seat, a compressible O-ring on the valve member and presented for engagement with said seat, said O-ring having an integral thin diaphragm therein with an axial aperture, and mounting means engaging said diaphragm and extending through said aperture and securing said diaphragm to the valve member, said diaphragm having spaced vent apertures between the mounting means and the O-ring portion thereof for equalization of pressure on both sides of the diaphragm and thereby preventing rupture of same.

6. In a valve, a housing having inlet and outlet ports communicating with an enlargement therebetween, a valve seat in said enlargement and having a flat seat face surrounding one of said ports, a valve member movable in said enlargement toward and away from said valve seat face and having a substantially flat face toward said valve seat face, a compressible seal member having a thin diaphragm portion with opposed sides and a peripheral O-ring portion with said O-ring portion projecting from both of said sides, an annular groove in the flat face of the valve member for receiving a projecting portion of said O-ring of the compressible seal member with the adjacent side of said diaphragm engaging the flat face of the valve member inwardly of said groove, the portion of the O-ring projecting from the other side of the diaphragm being disposed and presented for engagement with the flat valve seat face around said one port, said diaphragm having an aperture axially of said O-ring portion, and fastening means extending through said aperture and engaging said other side of the diaphragm adjacent said aperture for securing said diaphragm to the valve member to support the O-ring portion with a projecting portion in said groove, said diaphragm having vent holes therethrough between the fastening means and O-ring portion to equalize pressure on both sides of said diaphragm and thereby resist rupture of the diaphragm and displacement of said O-ring portion from said groove.

References Cited in the file of this patent

UNITED STATES PATENTS

| | | |
|---|---|---|
| 174,957 | Hill | Mar. 21, 1876 |
| 602,685 | Latshaw | Apr. 19, 1898 |
| 767,118 | Popham | Aug. 9, 1904 |
| 2,482,198 | Melichar | Sept. 20, 1949 |
| 2,767,735 | Darling | Oct. 23, 1956 |
| 2,923,317 | McInerney | Feb. 2, 1960 |